April 13, 1937.  W. MAYR  2,077,246
DEVICE FOR CLEANSING RAZOR BLADES
Filed March 23, 1936   2 Sheets-Sheet 1
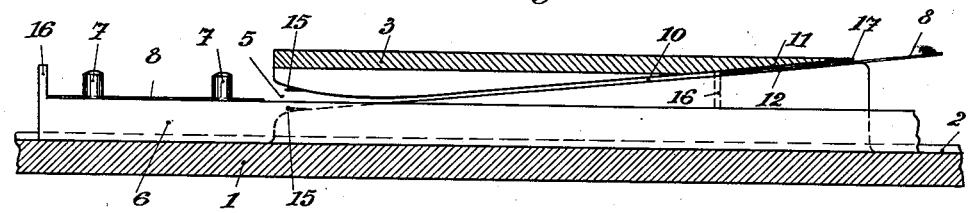
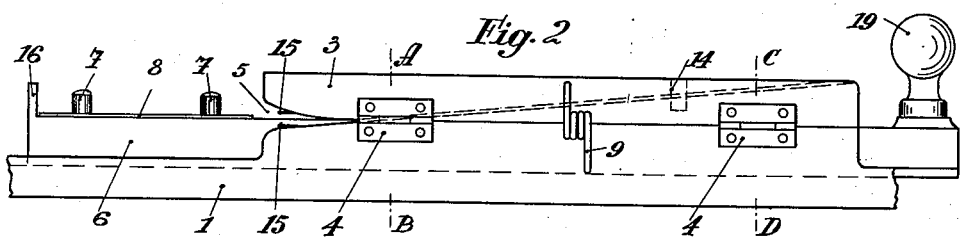
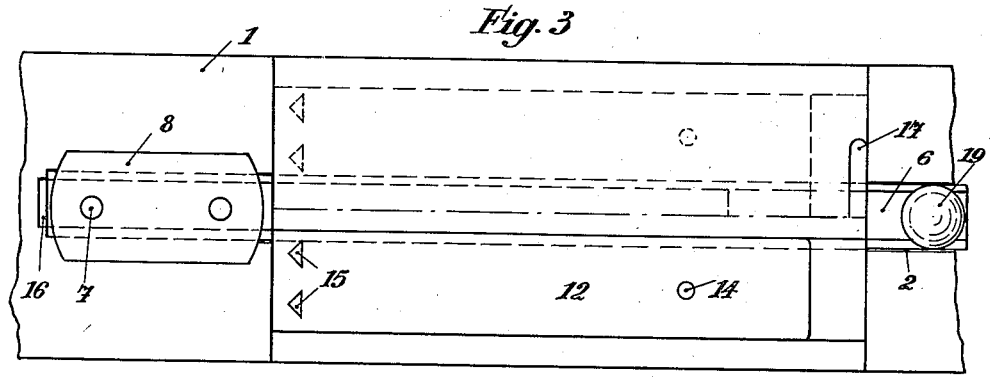
INVENTOR
Wilhelm Mayr
ATTORNEY April 13, 1937. W. MAYR 2,077,246
DEVICE FOR CLEANSING RAZOR BLADES
Filed March 23, 1936 2 Sheets-Sheet 2
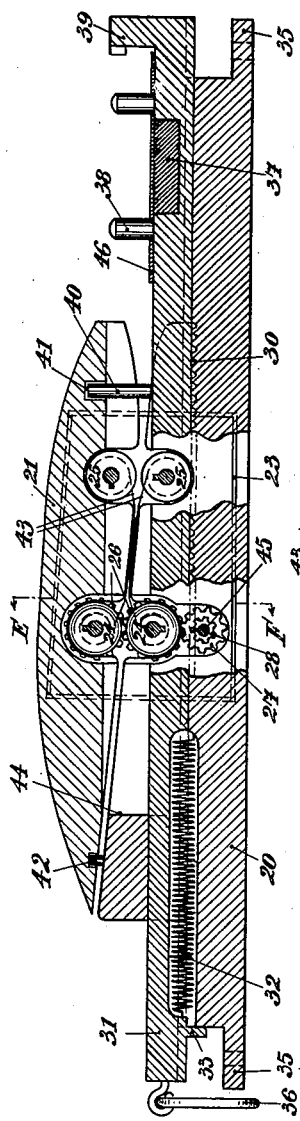
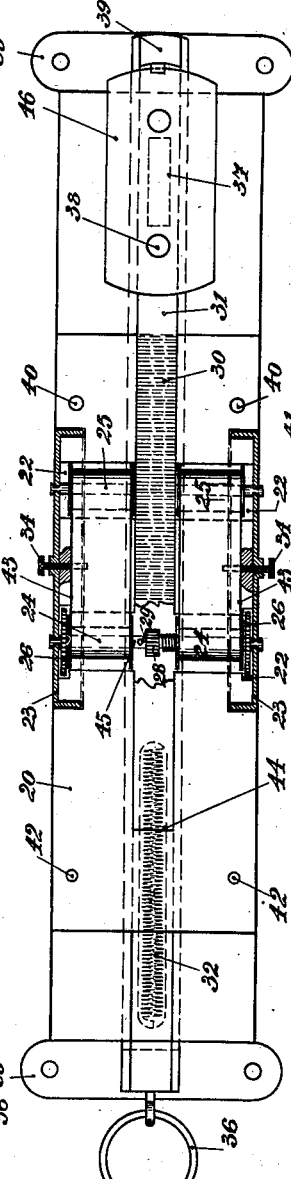
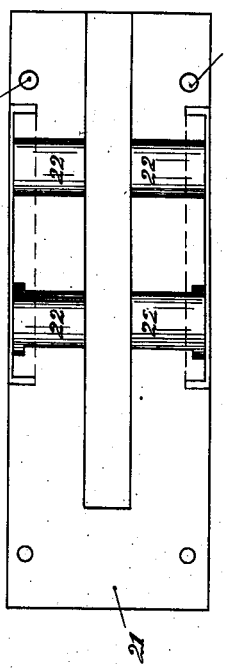
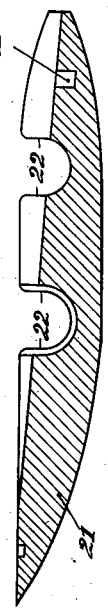
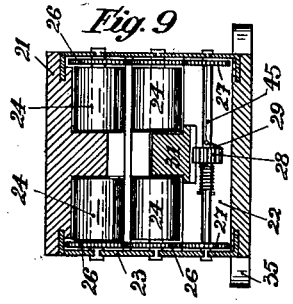
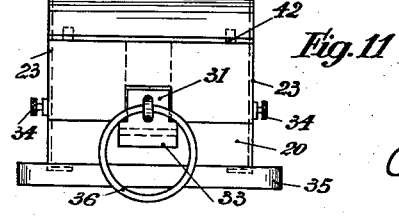
INVENTOR
Wilhelm Mayr
Arthur J. Stephens
ATTORNEY.

Patented Apr. 13, 1937

2,077,246

UNITED STATES PATENT OFFICE 2,077,246

DEVICE FOR CLEANSING RAZOR BLADES

Wilhelm Mayr, Dusseldorf, Germany

Application March 23, 1936, Serial No. 70,436
In Germany March 30, 1935

10 Claims. (Cl. 15—218)

The invention relates to a device for cleansing razor blades and the like by means of porous materials and is characterized by the feature that the blade is held by pins on a bar-form slider and is carried with its edges between runners arranged on both sides of the slider and covered with porous material, the runners being conveniently formed by suitable grooving or cutting away of a fixed lower part and an upper part closing thereon. The device permits razor blades to be cleansed and dried without danger after use, because the lather is removed from the edges and the blade at the same time dried during the passage of the blade edges between the porous pads arranged above and below on each side. Strips of paper, cellulose, cotton fabric or the like are suitable porous materials.

According to a further feature of the invention the runners in the lower and upper parts, covered with the porous material, are arranged inclined to the bottom of the device, rising from one end thereof towards the other, while the slider moves between the runners in a groove parallel to the bottom of the device, so that towards the end of the movement the blade lies higher than the holding pins and the latter therefore disengage the blade. The inclination is made such that when the blade ceases to be guided it projects so far from the device that at one end it is still held between the cleansing surface and at the other can be conveniently seized with the hand.

In a further embodiment of the invention there is provided in the upper cover-like part of the device a slot corresponding to the width of a blade, the plane of which slot coincides with or forms an extension of the cleansing surfaces, and a shoulder is provided on the slider behind the holding pins, against which the blade abuts and is carried a little further after it has moved out of engagement with the pins. The height of the shoulder and the position of the slot are made such that after cleansing about half of the blade projects out of the slot in the cover.

Since in the above device the runners can only be provided at the sides of the slider, the blade is only cleansed on the two cutting edges, while the centre part lying over the slider does not come into contact with the porous material. In order to enable this central part of the blade to be dried according to a further feature of the invention the porous layers in the upper and lower parts of the device are respectively united into a complete surface a short distance before the slot so that the blade must contact on both sides over its full breadth with the porous material shortly before it emerges from the slot.

The slider receiving the blade is provided at one end with pins spaced corresponding with the spacing of the apertures in usual commercially obtainable razor blades. The blade is placed by hand over these pins.

In a further advantageous embodiment of the invention, on each side of the slider and in both the upper and lower parts, a pair of rollers is provided which feeds a strip of porous material along the blade edge path, one roller serving as a supply roller for the fresh strip material and the other as a take-up roller for used material.

Rotation of the rollers can be effected from outside and by hand. Advantageously however the rollers are rotated by the slider, which for this purpose is provided underneath with a rack and actuates a pinion which transmits motion to the rollers through a shaft and further toothed wheels.

The pinion meshing with the rack is provided with a one-way clutch so that in one direction it runs loose on the shaft while in the other direction it entrains the shaft so that toothed wheels fast on the shaft rotate the rollers. The driving of the toothed wheels then takes place by the return of the slider to its starting position by the action of a tension spring after actuation. In this way after each time of use of the device the soiled parts of the porous strips are rolled off, so that fresh parts of the porous strips are always in position for each time of use.

To facilitate exchanging of the supply and take-up rollers, the pairs of rollers on each side are borne in a common frame member which is set in lateral recesses in the device and at the same time holds both parts together. It is therefore only necessary to remove the frames on both sides to replace the rollers with the used strips by new rollers with fresh strips. The two frames are secured in the device by screws or the like.

Two examples embodying the invention are shown in the accompanying drawings.

Figure 1 is a vertical longitudinal section of the first embodiment,

Figure 2 is a side view,

Figure 3 is a plan view with half the cover removed,

Figure 4 is an end view,

Figures 5 and 6 are cross sections taken respectively at about the level of the upper and lower hinges 4 in Figure 2. In Figures 4, 5 and 6 the actual cleaning strips have been omitted for the sake of clearness.

Figure 7 shows one piece of porous material.

Figure 8 is a vertical longitudinal section of the second embodiment with automatic roller feed, Figure 9 is a cross section of Fiuure 8, Figure 10 is a plan view of the device with the cover removed and certain parts in section.

Figure 11 is an end view of the device,

Figure 12 is a half plan of the cover from below and

Figure 13 is a section of the cover shown in Figure 12.

In Figures 1 to 7, the device comprises an under part 1 with guide groove 2 and a cover part 3, which is attached to the under part 1 by hinges 4 so that it can be swung over. At the point of entry of the blade 8 into the device the upper and lower parts are cut away to form a mouth 5. In the groove 2 moves a slider 6 with pins 7 over which the blade 8 is laid. The cover and under parts of the device, which are pressed together by a spring 9, are cut away on the inner sides in such a way that an inclined plane 10 is formed from the mouth 5 to the other end. Strips 11 and 12 of porous material are mounted on this inclined plane on both sides and on both cover and under part. These strips are provided with apertures 13 for attachment to pins 14 in the cover and under part. At the entry end the strips are pushed on to hooks 15. Behind the pins 7 is also a shoulder 16 against which the blade abuts. In the cover part of the device is a cross slot 17 into which the inclined cleansing surface runs out.

In use the blade is laid over the pins 7 on the slider 6 and then drawn through the device. The slider which is guided in the grooves 2, 18 in the under part remains in its horizontal position while the blade is gradually raised corresponding with the inclination of the cleansing plane until it comes out of engagement with the pins 7. At this moment only the shoulder 16 presses against the end of the blade until the latter projects about half way out of the slot 17. The cleansed blade can now be taken by the hand. This position is illustrated in Figure 1 as well as the entry position, the shoulder being shown in dotted lines in the former position. The slider 16 is operated by a handle 19 provided at the opposite end to the shoulder.

In the embodiment shown in Figures 8–13 in both the upper part 21 and under part 20 recesses 22 are provided which receive sets of rollers 24, 25 borne in frames 23. On each roller 25 is carried a strip 43 of porous material which is gradually wound off on to the corresponding roller 24. The rollers 24 are provided with toothed wheels 26 which on each side mesh together and with a further toothed wheel 27. The two wheels 27 are fast on the same shaft 45 as a pinion 28, the latter being loose on the shaft and only entrains the shaft in one direction by means of the one-way clutch device 29. The pinion meshes with a rack 30 secured on the underside of the slider 31. Further, a spring 32 is accommodated in a recess in the slider, by which the slider is automatically returned to its starting position after use, this position being limited by a stop 33 abutting against the under part 20.

The frames 23 with the rollers 24, 25 are each secured to the under part 20 by a screw 34. Two lugs 35 on this part enable it to be secured to a wall. To actuate the slider, a ring 36 is attached at one end by an eye. A permanent magnet 37 which holds the blade in position, is let into that part of the slider which receives the blade.

Figures 8 to 10 show the device in position ready for use. By actuating the slider the blade is drawn between the runners of the parts 20, 21 and along the inclined plane until raised out of engagement with the holding pins 38. At this point the shoulder 39 ensures the further movement of the blade until it can be removed from the slot by hand.

The transmission between the rack 30 and the rollers acts so that on the return of the slider after use of the device, the take-up rollers 24 are rotated by a suitable amount and thus roll up the used parts of the strips so that fresh parts of the strips are moved into the space between the sets of rollers on each side and above and below. During use of the device however the rollers remain stationary and the pinion rotates loosely on the shaft.

In order that the upper and lower parts may be held at such a distance apart that the lather can distribute itself as far as may be along the cleansing surfaces and not become dammed up at the mouth, pins 40 are provided on the under part 20 which engage in bores 41 in the upper part 21 and hold the cleansing surfaces at the desired spacing. The pins 42 at the other end serve the same end. The pins at the same time serve to secure a cleansing pad similar to that shown in Figure 7.

The device can be made of wood, or artificial material such as synthetic resin. The device can also be used in such a way that the slider remains stationary, and while the surfaces provided with the porous coverings are moved along the edges of the blade.

The operation of the device which is secured on the wall is very simple. After laying the blade 46 over the two holding pins the slider is drawn down by hand by means of the eye, until checked by 44. The blade in cleansed condition can then be removed from the slot, while the slider automatically returns and in doing so effects the roller feed.

What I claim is:—

1. A device for cleansing razor blades comprising a lower part and an upper part, said parts being shaped to form between them a longitudinal guide groove of less width than a razor blade, means holding said parts together, a slider movable in said groove, pins upon said slider to engage apertures in the blade, runners formed on each of said parts on opposite sides of and immediately adjacent said groove, the pair of runners on one part being opposite and parallel to those on the other and inclined longitudinally to said groove at such an angle that the blade leaves the pins towards the end of the movement of said slider when a portion of the blade projects from between the ends of the runners, and porous material on said runners.

2. A device as set forth in claim 1 in which the slider carries a shoulder to engage behind the end of the blade, and in which the runners are inclined to the path of the slider at such an angle that the space between them terminates in a slot in said upper part from which a portion of the blade projects when it has left the pins.

3. A device as set forth in claim 1 in which the runners are inclined to the path of the slider at such an angle as to reach a level above the slider, a surface there joining said runners on said upper and lower parts respectively, and porous material uniting the porous material respectively on said runners on said lower part and on said runners on said upper part.

4. A device for cleansing razor blades comprising a lower part and an upper part, said parts being shaped to form between them a longitudinal guide groove of less width than a razor blade, means holding said parts together, runners formed on each of said parts on opposite sides of and immediately adjacent said groove, the runners on one part being opposite and parallel to those on the other, a pair of rollers housed in recesses in each said runner, a strip of porous material wound upon the rollers of each said pair and extending over the part of the runner between them, a slider movable in said groove and means on said slider for supporting a razor blade with its edges projecting over the sides of the slider and between the said opposite runners.

5. A device for cleansing razor blades comprising a lower part and an upper part, said parts being shaped to form between them a longitudinal guide groove of less width than a razor blade, means holding said parts together, runners formed on each of said parts on opposite sides of and immediately adjacent said groove, the runners on one part being opposite and parallel to those on the other, a pair of rollers housed in recesses in each said runner, a toothed wheel upon one roller of each pair, said toothed wheels on opposite sides being axially aligned and in opposite runners being in mesh, a transverse shaft in one of said parts, a pair of toothed wheels upon said shaft and meshing one with one each of said meshing wheels, a pinion on said shaft, a strip of porous material wound upon the rollers of each said pair and extending over the part of the runner between them, a slider movable in said groove, means on said slider for supporting a razor blade with its edges projecting over the sides of the slider and between the said opposite runners, a rack on said slider meshing with said pinion, and a one way clutch in the transmission consisting of said rack, pinion, shaft and toothed wheels.

6. A device as set forth in claim 4 also comprising a frame on each side holding said upper and lower parts together and supporting the two pair of rollers on its own side.

7. A device as set forth in claim 5 also comprising a spring for moving said slider in the direction in which said one way clutch is operative.

8. A device as set forth in claim 4 in which the slider carries pins to engage apertures in the blade, and the runners are inclined to the path of the slider at such an angle that the blade leaves the pins towards the end of the movement of the slider when a portion of the blade projects from between the runners.

9. A device as set forth in claim 5 in which the slider carries pins to engage apertures in the blade and the runners are inclined to the path of the slider at such an angle that the blade leaves the slider towards the end of the movement of the slider in the direction in which the said one way clutch is inoperative.

10. A device as set forth in claim 5 comprising also a spring for moving said slider in the direction in which said one way clutch is operative, and in which the slider carries pins to engage apertures in the blade and the runners are inclined to the path of the slider at such an angle that the blade leaves the slider towards the end of the movement of the slider in the direction in which the said one way clutch is inoperative.

WILHELM MAYR.